Jan. 19, 1960 P. H. KOCH 2,921,565
STEAM GENERATING AND SUPERHEATING UNIT WITH DOWNSHOT
BURNERS AND GAS RECIRCULATION TEMPERATURE CONTROL
Filed Dec. 16, 1955 3 Sheets-Sheet 1

INVENTOR.
PAUL H. KOCH
BY
ATTORNEY

Jan. 19, 1960 P. H. KOCH 2,921,565
STEAM GENERATING AND SUPERHEATING UNIT WITH DOWNSHOT
BURNERS AND GAS RECIRCULATION TEMPERATURE CONTROL
Filed Dec. 16, 1955 3 Sheets-Sheet 2

INVENTOR.
PAUL H. KOCH
BY
*M. Holbrook*
ATTORNEY

INVENTOR.
PAUL H. KOCH

United States Patent Office

2,921,565
Patented Jan. 19, 1960

2,921,565

STEAM GENERATING AND SUPERHEATING UNIT WITH DOWNSHOT BURNERS AND GAS RECIRCULATION TEMPERATURE CONTROL

Paul H. Koch, Bernardsville, N.J., assignor to The Babcock & Wilcox Company, New York, N.Y., a corporation of New Jersey Application December 16, 1955, Serial No. 553,598

4 Claims. (Cl. 122—478)

This invention relates to the art of steam generation and steam superheating.

The invention includes within its purview a steam generating and superheating unit in which at least a high percentage of the steam generating surface is presented by steam generating tubes lining furnace walls, these tubes receiving substantially all of their heat by radiation from a high temperature combustion zone within the furnace, and from the gas products of combustion. After leaving the combustion zone the combustion gases transmit heat to a steam superheater which receives its steam from the steam generated within the tubes. Such steam generating units are designed with sufficient steam generating surface in the furnace walls, ahead of the superheater, to absorb a relatively large proportion of the total heat released in the unit, in the furnace, so that the temperature of the combustion gases contacting the superheater tubes at maximum continuous operating load will permit the superheater tube metal temperature to be maintained within safe limits, to avoid slagging of the superheater tubes when a slag forming fuel is burned. Also, in such steam generators the fuel burners are constructed and located at points such that there is a minimum of flame impingement on the furnace walls, and the furnaces are so constructed that there is ample space for the completion of combustion within the furnace. When a slag forming fuel is burned and the incombustible ash constituents (or slag) are removed from the furnace bottom in a relatively dry state, it is essential that the fuel burners be so located that there is adequate heat absorbing surface in the form of steam generating wall tubes between the main combustion zone and the furnace bottom to absorb sufficient heat by radiation to reduce the gas temperature in the space there-between so that the descending ash particles will solidify before they reach the furnace bottom. At high heat release rates the furnace chamber is normally filled with high temperature combustion gases flowing at a relatively high velocity to the furnace exit and losing heat substantially entirely by radiation to the furnace wall tubes.

In the illustrative steam generating and superheating unit the fuel burners are long flame burners and combustion air is supplied to the burners in such a manner as to gradually mix with the fuel stream along its path. The steam generating furnace wall tubes extend substantially throughout the entire height of the furnace and the furnace gas exit is disposed at an intermediate position relative to the height of the furnace. With this arrangement the main combustion zone does not extend entirely to the bottom of the furnace and, hence, the bottom of the furnace is not as subject to such high gas temperatures and such high gas velocities as that part of the furnace within the main combustion zone.

Steam generating and superheating units of the type involved in this invention usually operate in conjunction with a steam turbine and they operate most efficiently when the turbine receives its steam supply at a constant or predetermined temperature over the load range of the unit. The pertinent unit with its water-cooled furnace and convection type superheater so operates that the total steam generation may vary over wide load range, while the maximum flame of furnace gas temperatures remains substantially the same, but the temperature of the superheated steam tends to decrease with a decrease in load due to the lower gas temperature entering the superheater and due to the decrease in gas mass flow resulting from the decreased amounts of fuel and air supplied at the lower loads. The lower gas temperatures are due to the fact that the radiant heat absorption by the furnace wall tubes, although reduced at lower loads, is not reduced in the same proportion as the load is reduced, as the amount of furnace heat absorption surface remains constant and the radiant heat absorption is proportional to the fourth power of the absolute temperature of the source of radiation.

With lower temperature and lower mass flow of the gases contacting the superheater tubes the final superheat temperature progressively falls with decreasing load and one of the primary objects of this invention to prevent such a decrease in superheat temperature and maintain that temperature at a predetermined value over a wide load range. This is particularly important from the standpoint of turbine efficiency and maintenance.

The invention involves the supplying of additional gases in the form of inert combustion gases recirculated to the furnace from a location in the gas path downstream of the superheater, in increasing proportion as the load decreases. These recirculated gases, in conjunction with the unrecirculated gases issuing directly from the fuel burners result in an increased gas mass flow over the superheater and this increased mass flow more than off-sets any decrease in the temperature of the gases contacting the superheater and thereby provides for an increase in superheat, up to the predetermined value.

If the inert recirculated gases are thoroughly mixed with the air and/or fuel and so introduced into the furnace, the maximum flame temperature in the furnace will be lowered due to the retardation of ignition and combustion of the fuel and the necessity of heating the added gas to flame temperature, and if too great a quantity of gases should be recirculated in this manner, fuel ignition may be lost. The introduction of such recirculated gases through the fuel burning ports would involve either a considerable decrease in the velocity or the entire fuel and gas mixture of modification of the burner ports if the same velocity conditions are to be maintained, both of these results being undesirable. The introduction of such recirculated gases at a location between the main combustion zone and the gas exit of the furnace would not affect the fuel combustion to the same extent, but would result in less mixing of the recirculated gases with the unrecirculated gases before the combined gases reached the superheater. Such recirculation methods could also result in increased fan power requirements and a lower overall thermal efficiency of the unit.

The present invention involves a method of, and apparatus for, control of superheat temperature over a wide load range by the recirculation of combustion gases from a location in the furnace gas flow path downstream of the superheater and the introduction of such withdrawn gases into the lower part of a fluid cooled furnace of a vapor generating and superheating unit and at such a position that the furnace gas exit is disposed at a level intermediate the level of the main combustion zone of the furnace and the level at which the recirculated gases are introduced, this method attaining a high degree of superheat control over a very wide load range. The method of the invention may be described as involving the interoduction of a variable steam of recirculated inert gases into the furnace at such a location that a relatively thick layer or stratum of the gases at a temperature substantially lower than the unrecirculated gases, is interposed between the main combustion zone and a substantial area of the furnace wall steam generating tubes. This inter-posed stratum or body of gases functions to substantially reduce the absorption of heat radiantly transmitted to the furnace wall tubes and to thereby leave a corresponding greater quantity of heat in the gases for increased heat transmission to the superheater.

The amount of heat radiated by the high temperature gases in the main combustion zone is not only a function of the gas temperature, but also a function of the area of the heat radiating source. With gas recirculation in accordance with the invention the unrecirculated combustion gases in the main combustion zone are crowded into a smaller cross sectional flow area perimeter by the recirculated gases. The introduction of recirculated gases also results in a shorter path of travel of the high temperature or unrecirculated gas from the burners to the furnace gas outlet. Their residence time in the furnace is also decreased.

The inter-position of the recirculated lower temperature gases between the main combustion zone and a large area of the furnace wall tubes, coupled with a substantial decrease in the volume of the main combustion zone results in a considerable increase in the temperature of the gases leaving the furnace. By the use of the present invention the superheater tubes are contacted by a greater mass flow of gases at an increased temperature, and a substantially increased superheat temperature is thus attained. The rise in superheat temperature is dependent upon the amount of gas recirculated and the rate of gas recirculation is increased to effect a predetermined or optimum superheat temperature as the load decreases.

The invention will be set forth in a concise matter in the claims, but for a complete understanding of the invention, its advantages and use, recourse should be had to the following description which refers to the preferred embodiment of the invention shown in the accompanying drawings.

Figure 4:
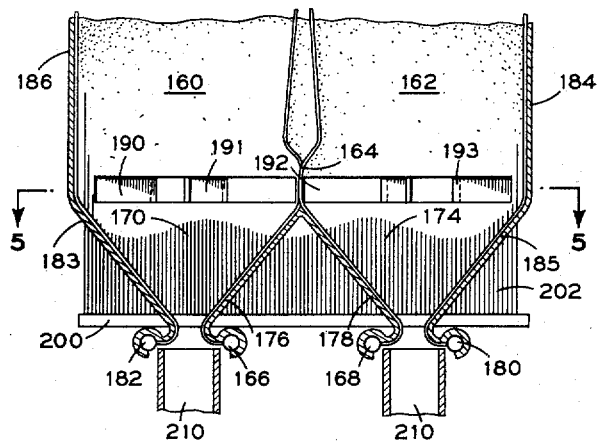
Figure 5:
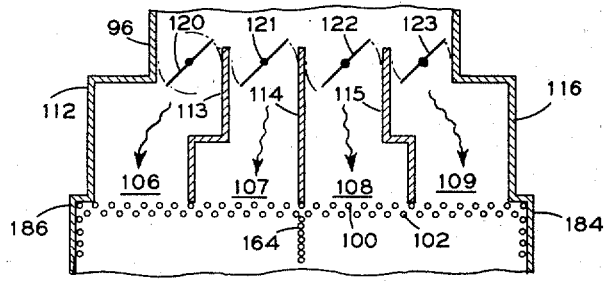

Fig. 4 is a fragmentary vertical section through a modified arrangement of furnace components and recirculated gas introducing means, involving a division wall between two furnace sections, hopper bottom furnace sections, and means for introducing the recirculated gases at a position adjacent the upper parts of the hoppers and in a direction parallel with the long axes of the hoppers; and Fig. 5 is a fragmentary horizontal section on the line 5—5 of Fig. 4, illustrating the ductwork and dampers for distributing the recirculated gases in their introduction into the furnace.

Figure 1:
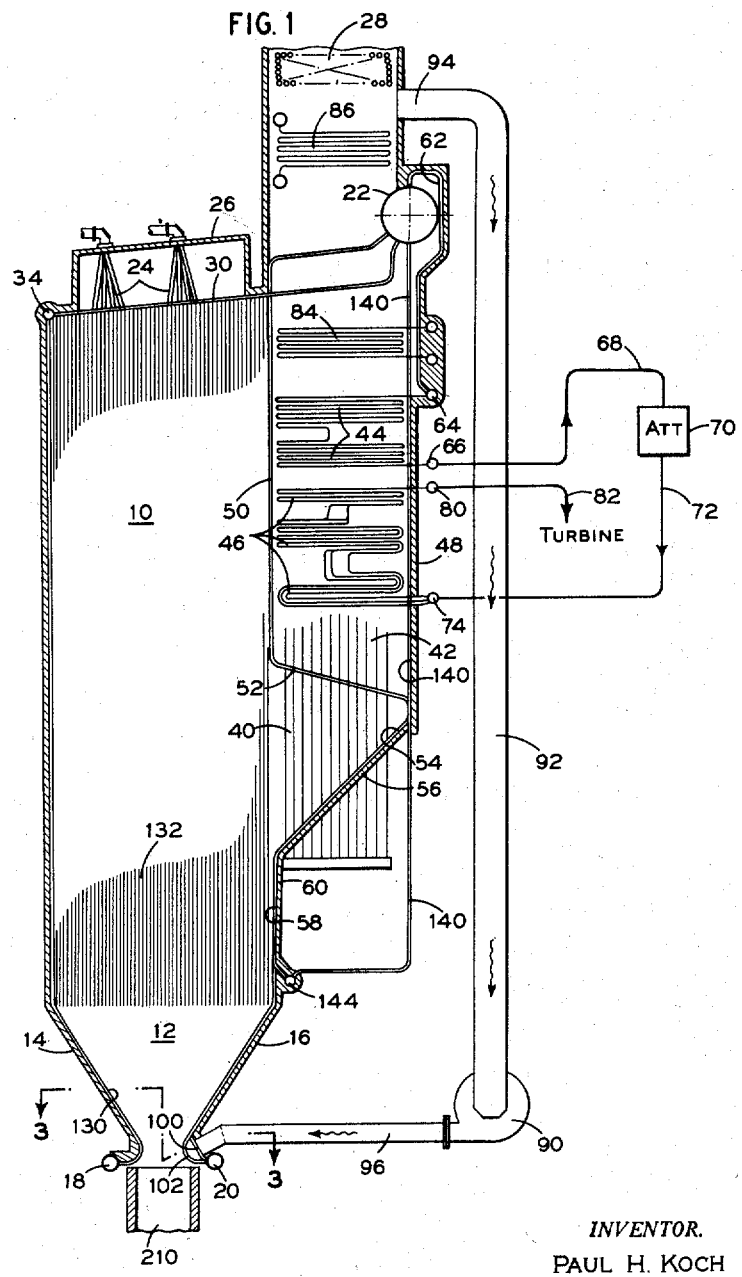
Fig. 1 is a vertical section or side sectional elevation of a steam generating and superheating unit constructed and arranged with a gas recirculation system for superheat control over a wide load range, in accordance with the teachings of the invention.
Figure 2:
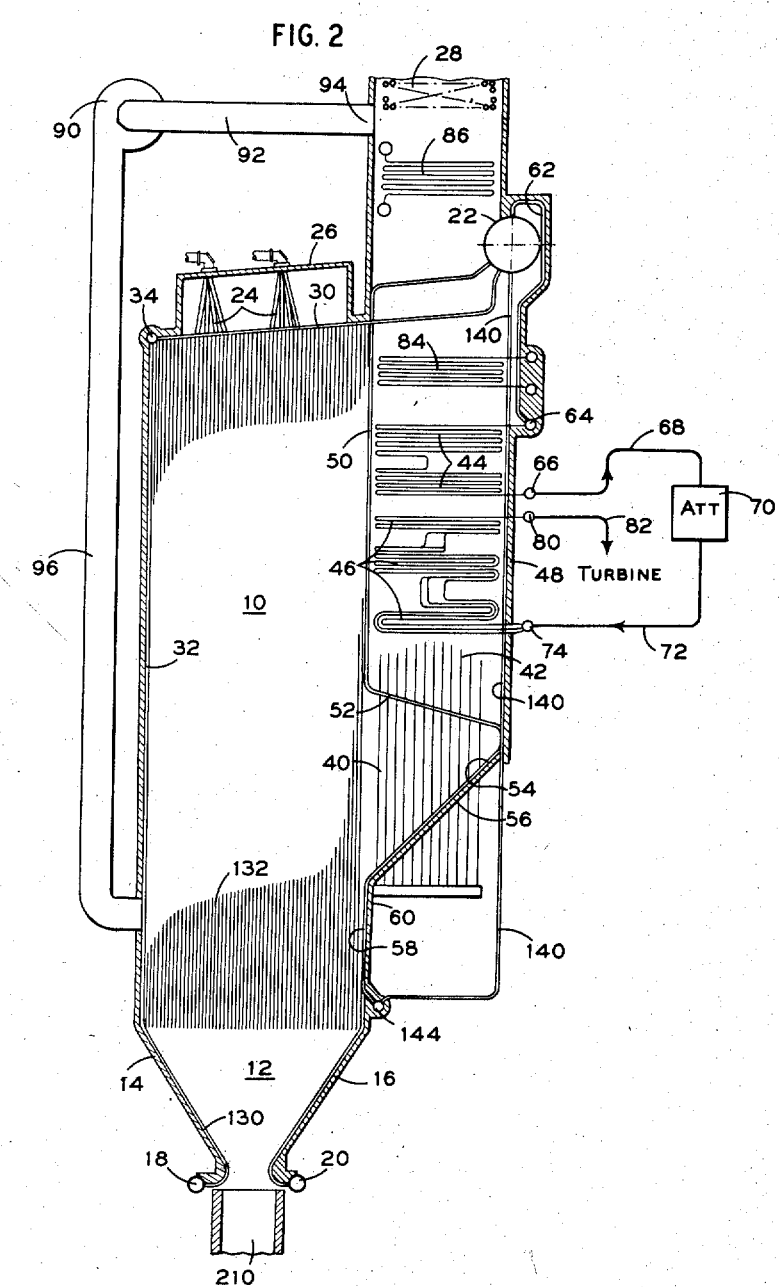
Fig. 2 is a vertical section or side sectional elevation of a modified steam generating and superheating unit with the gas recirculation system introducing the recirculated gases into the furnace at a different position, with respect to the steam generating surfaces along the furnace walls.

The general type of steam generating and superheating unit illustrated in Figs. 1 and 2 is shown in more detail, and described in the U.S. patent to Raynor 2,512,677 of June 27, 1950. The steam generating unit may be utilized for the production of steam at a pressure of the order of 2400 pounds per square inch and at a maximum continuous capacity of the order of a million pounds of steam per hour. This type of unit involves a furnace having a vertically elongated combustion chamber 10 with a height of the range of 60 to 100 feet. It is preferably rectangular in cross-section, with upright walls of widths ranging from 20 to 40 feet. The unit illustrated has a hopper bottom 12 with downwardly converging side walls 14 and 16, these walls, along with the upright front and rear walls and roof of the unit, are preferably lined with steam generating wall tubes appropriately connected into the circulation of the unit by suitable circulatory connections with the lower headers 18 and 20 and the steam and water drum 22.

The furnace is preferably downwardly fired by downshot burners 24 provided with combustion supporting air through a windbox 26 and appropriate ductwork connections leading thereto from an air heater 28. These burners project streams of fuel and air between the steam generating furnace roof tubes 30, which are shown as communicating with the front wall tubes 32 through the intermediacy of the upper front wall header 34. The burners preferably burn pulverized solid fuel such as coal, but they may be also combination burners adapted to burn one or more of several fuels, including oil and gas. The furnace gas exit may be considered as disposed at 40, at the lower part of the furnace. From this exit the gases pass upwardly through a convection gas pass 42, which includes a primary convection superheater 44 and a secondary convection superheater 46. These superheaters includes banks of serially connected return bend tubes extending across the gas flow in the gas pass 42 from its rear wall 48 to its front wall 50, which divides the furnace from the convection gas pass and includes steam generating tubes, parts of which are widely spaced in screen formation at 52 across the gas entrance of the gas pass. These tubes have downward extensions 54 along the inclined wall 56 at the bottom of the gas pass, and other sections 58 along the lower portion of the rear wall 60 of the furnace. Hence, these tubes lead downwardly along the hopper bottom wall 16 to the lower header 20.

Steam, separated from the steam and water mixtures entering the steam and water drum 22, passes through one or more superheater supply tubes 62, downwardly to the superheater inlet header 64. From this header steam passes through the banks of tubes of the primary convection superheater 44 to the primary superheater outlet header 66, and then continues through appropriate conduits 68 through a spray attemperator 70, from which the steam flows through one or more conduits 72 to the inlet header 74 of the secondary convection superheater 46. From this superheater the steam passes to an outlet header 80 and thence through appropriate lines 82 to a point of use such as the high pressure section of a multiple stage steam turbine.

The heating gases leaving the primary superheater 44 pass across the bank of tubes of the economizer section 84, and then across the second economizer section 86, these sections being appropriately connected to a source of feedwater and to the steam and water drum to supply feedwater to the latter.

To compensate for the inherent tendency of the convection superheater whereby its operation is characterized by a fall in its superheat temperature curve as the load decreases, the illustrative unit is provided with a gas recirculation system including a fan 90, and fan inlet ductwork 92, leading from a point of communication with the upright gas pass 42 at the position 94. The outlet ductwork leading from the fan 90 extends, as illustrated at 96 in Fig. 1, to the lower part of the hopper bottom 12, the flow of recirculated gases into the hopper bottom being controlled and distributed throughout the length of the hopper by the specific ductwork and flow regulating devices indicated in Fig. 5 of the drawings, or by such ductwork as that illustrated in Fig. 3 of the drawings.

Figure 3:
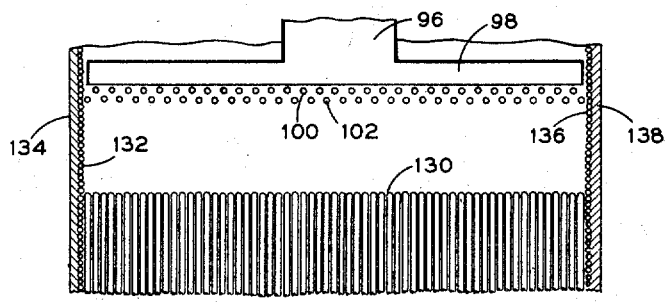
Fig. 3 is a fragmentary dual plane horizontal section on the section line 3—3 of Fig. 1.

Fig. 3 illustrates a part of the fan outlet ductwork 96 for the recirculated gas system, as communicating with a cross duct 98 extending throughout the length of the hopper and leading between the widely spaced parts 100 and 102 of the steam generating tubes at the throat of the hopper bottom 12.

When a recirculated gas introducing ductwork arrangement similar to Fig. 5 is utilized, the flow of recirculated gases is distributed throughout the length of the hopper bottom by a plurality of ducts 106–109 formed by walls 112–116 leading from the fan outlet duct 96, with the gas flow through the separate ducts 106–109 regulated by the dampers 120–123.

In Fig. 3 the hopper bottom steam generating tubes 130 are shown, along with the side wall furnace steam generating tubes 132, arranged along the furnace side wall 134. Similar steam generating tubes 136 are indicated at the opposite side wall 138 of the furnace.

The main components of the Fig. 2 steam generating and superheating unit are similar to those of the Fig. 1 unit and they bear similar reference characters. Each unit includes fluid conducting tubes 140 leading downwardly from the lower part of the steam and water drum 22, and along the wall 48 of the gas pass 42. The lower ends of some of these tubes are connected to the header 144 at the top of the hopper bottom wall 16 and from this header there extends some of the tubular sections 58 and 54 along the furnace wall 60, and the inclined wall 56 at the lower part of the gas pass. Others of the downcomers are connected to the headers 18 and 20.

The steam generating and superheating units of Figs. 1 and 2 are preferably provided with such control systems that, as the steam generating rate decreases from control point load to a low load of the order of 10 to 30% of control point load, the flow of recirculated and lower temperature gases into the lower part of the furnace is increased to such an extent that the temperature of the superheated steam is maintained at a predetermined value over the entire control range. The reverse operation as to change in load and change in the rate of flow of recirculated gases takes place as the load increases from low load value to control point load. The control system operates from such variables as rate of steam flow or representations thereof, and representations of final temperature of the superheated steam. The control system involves known control components and the system may be such as that shown and described in the co-pending application Serial No. 193,832, filed on November 3, 1950 and belonging to the same assignee. These control systems are illustrated in Figs. 5 and 6 of the drawings of that co-pending application.

The increased flow of recirculated gases into the lower part of the furnace and at a position below the level of the gas exit of the furnace serves to maintain a body of lower temperature gases between the main combustion zone at the upper part of the furnace 10, and the steam generating tubes in the lower part of the furnace. This body of lower temperature gases in the lower part of the furnace serves to reduce the proportional heat absorption of the steam generating tubes in that part of the furnace leaving more heat content in the gases passing to the superheater.

The control system of the illustrative units may also involve the controls such as those disclosed in the pending applications to Moonan S.N. 542,927, Troutman S.N. 542,925, and Stallkamp S.N. 542,926, now Patent No. 2,875,736 all filed October 26, 1955, for so controlling the operation of the recirculated gas system, and more particularly the gas flow in the vicinity of the recirculating gas fan that any reverse flow of gases from the furnace into the normal outlet of the gas fan is prevented at low rates of flow of recirculated gas.

The fan outlet ductwork 96 of the Fig. 2 unit leads into the lower part of the furnace chamber 10 but still at a level below the level of the gas exit 40 of the furnace. The recirculated gas fan outlet ductwork may be provided with such plural ducts as those indicated at 106–109 in Fig. 5, along with the associated gas flow regulators 120–123.

The Fig. 5 arrangement of multiple recirculated gas ducts leading into the furnace is particularly applicable to the Fig. 4 embodiment wherein there are two furnace chamber sections, 160 and 162 separated by a division wall 164 of steam generating tubes leading upwardly from the headers 166 and 168 at the lower parts of the hopper bottoms 170 and 174. These tubes lead upwardly along the inclined walls 176 and 178 of the hopper bottoms, and similarly arranged tubes lead upwardly from the hopper bottom headers 180 and 182 along the hopper bottom inclined walls 183 and 185 and then along the furnace walls 184 and 186, respectively.

The Fig. 4 unit has a gas recirculation system similar to that indicated in Fig. 1 or in Fig. 2 with the outlets of the fan outlet ductwork of the gas recirculation system distributed across the furnace sections 160 and 162, as indicated at 190–193.

The Fig. 4 modification includes side wall headers such as 200 for the side wall tubes such as 202 which, in the pertinent arrangement of Fig. 5 correspond to the tubes 100 and 102.

In each of the Fig. 1, Fig. 2, and Fig. 4 units there is a relatively long flame path from the burners to the furnace gas exit, and there is considerable wall cooling surface provided below the level of the furnace gas exit. These wall cooling surfaces provide such a degree of cooling of the gases and their suspended particles within the furnace that, when the pulverized fuel is burned in the furnace at temperatures above the fusion temperature of the slag resulting from the burning of the fuel, the slag particles are transformed to a relatively dry state as they pass through the hopper bottom, its throat, and into the slag pit 210. Such cooling of the fused slag particles is further promoted by the operation of the pertinent gas recirculation system, and the operation of these systems also results in a decreased length of gas flow path from the burners to the furnace gas exit as the lower part of the furnace is filled with the lower temperature recirculated gases which tend to crowd the unrecirculated gases into a shorter gas path. This action also reduces the residence time within the radiant heat absorption zone of the furnace of the high temperature gases, thus reducing the proportionate amount of heat transmitted from the gases to the steam generating tubes in the furnaces and proportionately increasing the heat content in the gases available for superheating steam in the convection gas pass.

Certain features of the present invention are disclosed in my prior copending application Serial Number 291,686, filed June 4, 1952, now Patent No. 2,871,833.

Although the invention has been described with reference to the details of preferred embodiments thereof, it is to be recognized that the invention is not limited to all of the details thereof. The invention is rather to be considered of a scope commensurate with the scope of the sub-joined claims.

What is claimed is:

1. In a steam generating and superheating unit, means forming a vertically elongated furnace chamber, said means including steam generating wall tubes connected into the circulation system of the unit, fuel burning means for effecting combustion in said chamber, said fuel burning means being disposed at the upper part of said chamber and projecting burning fuel and heating gases downwardly in the chamber, means forming a convection gas pass having its gas inlet in communication with the gas outlet of the furnace chamber at the lower part of that chamber, said gas outlet for the furnace chamber being located at the lower part of the furnace chamber, a convection steam heater disposed within said gas pass, and a gas recirculation system including a fan with its associated fan inlet duct work and fan outlet duct work, the fan inlet duct work communicating with gas flow in said gas pass at a position downstream of the steam heater and the fan outlet duct work communicating with the furnace chamber at a level substantially below the level of the gas outlet of the furnace chamber and arranged to provide a body of recirculated gas in the lower end of said chamber opposing the downward flow of heating gases below the level of said gas outlet, at least a substantial part of the furnace chamber wall steam generating tubes extending from the upper part of the chamber to its lower part at a position substantially below the level of the furnace chamber gas outlet.

2. In a vapor generating and superheating unit, means forming a vertically elongated furnace chamber with a hopper bottom, said means including vapor generating wall tubes connected into the circulation system of the unit, slag forming fuel burning means for effecting combustion in said chamber, said fuel burning means being disposed at the upper part of said chamber and projecting burning fuel and heating gases downwardly in the chamber, means forming an upflow convection gas pass having its gas inlet in communication with the gas outlet of the furnace chamber at the lower part of that chamber, said gas outlet for the furnace chamber being located at the lower part of the furnace chamber, a convection vapor heater disposed within said gas pass, and a gas recirculation system including a fan with its associated fan inlet duct-work and fan outlet duct-work, the fan inlet duct-work communicating with gas flow in said gas pass at a position downstream of the superheater and the fan outlet duct-work communicating with the furnace chamber hopper bottom at a level below the level of the gas outlet of the furnace chamber and arranged to provide a body of recirculated gas in said hopper bottom opposing the downward flow of heating gases below the level of said gas outlet, at least a substantial part of the furnace chamber wall vapor generating tubes extending from the upper part of the chamber to its lower part at a position substantially below the level of the furnace chamber gas outlet.

3. In a steam generating and superheating unit, means forming a vertically elongated furnace chamber with a hopper bottom, said means including steam generating wall tubes connected into the circulation system of the unit, fuel burning means for effecting combustion in said chamber, said fuel burning means being disposed at the upper part of said chamber for projecting burning fuel and heating gases downwardly in the chamber, means forming a convection gas pass having its gas inlet in communication with the gas outlet of the furnace chamber at the lower part of that chamber, said gas outlet for the furnace chamber being located at the lower part of the furnace chamber, a convection steam heater disposed within said gas pass, means whereby the steam heater receives steam generated in the unit, and a gas recirculation system including a fan with its associated fan inlet duct-work and fan outlet duct-work, the fan inlet duct-work communicating with gas flow in said gas pass at a position downstream of the superheater and the fan outlet duct-work communicating with the furnace chamber hopper bottom at a level below the level of the gas outlet of the furnace chamber and arranged to provide a body of recirculated gas in said hopper bottom opposing the downward flow of heating gases below the level of said gas outlet, at least a substantial part of the furnace chamber wall steam generating tubes extending from the upper part of the chamber to its lower part at a position substantially below the level of the furnace chamber gas outlet, said recirculated gas fan outlet ductwork having means associated therewith at the furnace chamber wall for promoting uniform distribution of the introduced recirculated gas throughout the length (or width) of a furnace chamber wall.

4. In a steam generating and superheating unit, means forming a vertically elongated furnace chamber, said means including steam generating wall tubes connected into the circulation system of the unit, fuel burning means for effecting combustion in said chamber, said fuel burning means being disposed at the upper part of said chamber projecting burning fuel and heating gases downwardly in the chamber, means forming a convection gas pass having its gas inlet in communication with the gas outlet of the furnace chamber at the lower part of that chamber, said gas outlet for the furnace chamber being located at the lower part of the furnace chamber, a convection steam heater disposed within said gas pass, and a gas recirculaton system including a fan with its associated fan inlet duct work and fan outlet duct work, the fan inlet duct work communicating with gas flow in said gas pass at a position downstream of the steam heater and the fan outlet duct work communicating with the furnace chamber through a wall thereof at a level substantially below the level of the gas outlet of the furnace chamber and arranged to provide a body of recirculated gas in the lower end of said chamber opposing the downward flow of heating gases below the level of said gas outlet, at least a substantial part of the furnace chamber wall steam generating tubes extending from the upper part of the chamber to its lower part at a position substantially below the level of the furnace chamber gas outlet, said recirculated gas fan outlet ductwork having duct division partitions and associated flow regulating devices for effecting more uniform distribution of the introduced recirculated gases throughout the width of the connected furnace chamber wall.

References Cited in the file of this patent

UNITED STATES PATENTS

| 2,781,746 | Armacost et al. | Feb. 19, 1957 |

FOREIGN PATENTS

| 1,065,655 | France | Jan. 13, 1954 |
| 1,080,188 | France | May 26, 1954 |
| 523,870 | Great Britain | July 24, 1940 |

OTHER REFERENCES

Journal of The Iron and Steel Institute, August 1947, pages 547 through 551.